Oct. 23, 1962

C. M. JOHNSON 3,059,714

SCRAPER DRIVE AND MOUNTING

Filed Aug. 10, 1961

INVENTOR
CHARLES M. JOHNSON

BY Cushman, Darby & Cushman

ATTORNEYS

Oct. 23, 1962

C. M. JOHNSON 3,059,714

SCRAPER DRIVE AND MOUNTING

Filed Aug. 10, 1961

INVENTOR
CHARLES M. JOHNSON

BY Cushman, Darby &
Cushman

ATTORNEYS

3,059,714
SCRAPER DRIVE AND MOUNTING
Charles M. Johnson, Lubbock, Tex., assignor to Johnson Manufacturing Company, Lubbock, Tex., a corporation of Texas
Filed Aug. 10, 1961, Ser. No. 130,595
10 Claims. (Cl. 180—14)

This invention relates to a tractor-propelled trailer or semi-trailer type vehicle, such as an earth-scraping machine, and particularly to a coupling between the forward end of the vehicle and the rear end of a tractor which provides for attachment of the vehicle to the tractor and for a rotatable power drive between operating parts of the vehicle and a conventional power-take-off shaft on the tractor.

Couplings which are arranged to transmit power by means of a rotatable shaft and to provide attachment between a prime mover and a towed vehicle are known in the prior art, and specific reference is made to Patent No. 2,931,451 issued April 5, 1960, for a disclosure of a coupling of the general type contemplated by the present invention. The major concern with any coupling between a prime mover and a towed vehicle is the provision of joints which will permit independent movement of the two machines as they make turns and as they travel over hills and uneven ground. It is apparent that any such coupling must permit pivotal movement between the two machines about a vertical axis during turns, about a horizontal axis transverse to the machines when moving onto or off of a slope and about a horizontal axis longitudinal to the machines when negotiating rough, uneven ground which causes relative lateral tilting of the machines.

In order to accommodate for such relative pivoting movements, the rotatable drive in couplings such as that disclosed in Patent No. 2,931,451 includes several universal joints and a telescopic section arranged between the power-take-off shaft on the tractor and the input drive shaft to the driven elements on the vehicle. More in particular, the coupling of the patent includes a first member mounted over the rear axle and pivotable about an axis parallel to the axle, a second member pivoted at its lower portion to the upper portion of the first member for rotation about a longitudinal axis and adapted at its upper portion to support the forward end of the vehicle, a rearward frame extension fixed to the frame of the tractor, and a rigid power transmitting coupling mounted on the rear of the extension. The input end of the rigid coupling is connected through universal joints to the power-take-off shaft and the output end is connected through universal joints, a telescopic section and gear boxes to the input drive shaft to the driven elements on the vehicle. It is apparent that the frame extension in this arrangement will pivot about the rear axle of the tractor when the tractor moves onto or off of a slope. Therefore, the rigid power transmitting coupling being positioned considerably to the rear of the axle will swing in an arc of considerable length, and the single telescopic section in the drive must adjust for this movement. It is apparent also that the fitting of a frame extension to a tractor requires a number of members which must be designed to fit each different tractor to which they are to be attached.

The coupling and drive of the present invention employ conventional universal joints and telescopic drives in a novel arrangement with the various pivot axes in the coupling such that telescoping movement between parts is held to a minimum thereby reducing the tendency of the telescoping sections to bend or break during operation. In addition, the coupling and drive are adapted to be easily fitted to different tractors without the use of special members designed for each type of tractor. More in particular, the invention includes first and second pivoted members similar to those described above and a drive having a rigid power transmitting coupling rigidly mounted on the first pivotable member. The mounting of the rigid power transmitting coupling on the first pivotable member reduces the telescopic movement required in each of two telescopic sections in the drive. In addition, the combined coupling and drive may be directly mounted on any tractor axle housing by means of suitable clamps and thus requires no special members or modifications for use with different tractors.

It is therefore a primary object of the present invention to provide an improved coupling and power transmitting drive between a towed vehicle and a prime mover having a power-take-off thereon which reduces the telescopic movement between parts of the drive while maintaining latitude of relative movement between prime mover and towed vehicle.

It is a further object of the present invention to provide an improved coupling and power transmitting drive between a towed vehicle and a prime mover having a power-take-off thereon which is adapted to be easily connected to the rear end of different prime movers with a minimum of labor and parts.

It is a further object to provide a unitary coupling and power transmitting drive between a towed vehicle and a prime mover having a power-take-off thereon which is readily removable as a unit from the vehicle and the prime mover.

Further objects and advantages will become apparent from a reading of the following detailed description of an illustrative embodiment of the invention taken in conjunction with the drawings in which.

Figure 1:
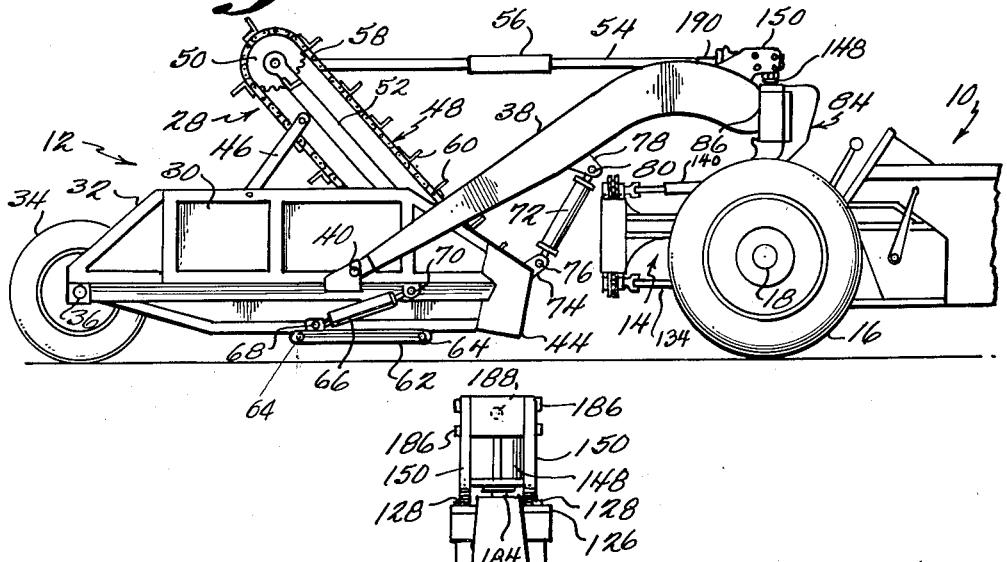
FIGURE 1 is a side elevational view of a tractor and an earth-scraping machine connected by means of a coupling and power transmitting drive which embody the principles of the present invention.

Referring to the drawings, there is shown a conventional tractor 10 and a conventional earth-scraping and moving machine 12 connected in trailing relationship therewith by means of a coupling and power transmitting drive 14 embodying the principles of the present invention. The tractor 10 includes, as is conventional, rear ground-engaging wheels 16 mounted on an axle 18 within an axle housing 20, a differential housing 22 containing the tractor drive shaft 24 and a power-take-off shaft 26 extending rearwardly from the differential housing 22.

The earth-scraping machine 12 may be of any conventional construction which includes power driven parts such as a conveyor 28 for aiding the movement of dirt into the machine. The machine illustrated in the drawings includes transversely spaced vertical side walls 30 fastened to a suitable frame 32 which is supported at its rear end by a centrally located ground-engaging wheel 34 suitably mounted on an axle 36. A pair of arms 38 straddle the frame 32 and are pivoted thereto as at 40. Forwardly of the frame 32, the arms 38 terminate in a gooseneck structure 42 which rests on the rear end of the tractor 10 thereby supporting the forward end of the frame. A scraper blade 44 extends transversely across the lower edge of the front of the frame 32 and is adapted to engage the ground during a scraping operation. The endless chain conveyor 28 is mounted above the frame 32 between the spaced side walls 30 by suitable brackets 46. As fully described in applicant's Patent No. 2,984,022, granted May 16, 1961, the conveyor includes a pair of spaced endless chains 48 strung over spaced sprocket wheels which are mounted at opposite ends of a rigid frame member 52. The upper sprocket wheel 50 is driven through a suitable gear box (not shown) by a drive shaft 54 having a telescopic section 56 therein. The chains 48 include pivoted links 58 to which transverse flights 60 are connected. The conveyor is pivotally supported at its upper end on the brackets 46 for rotation about an axis transverse to the machine so that the lower end may ride up on loosened dirt which has been scraped into the front of the frame by the scraper blade.

A bottom wall (not shown) of the machine extends rearwardly of the scraper blade 44 between the side walls 30 and is provided with a forward and a rear transverse dump flap (not shown) which are hinged to the side walls 30. The dump flaps are maintained in a closed or open position by means of a hydraulic piston and cylinder 66, the outer end of the piston being pivoted as at 68 to a connecting bar 62 which is pivoted to the forward edges of each of the dump flaps as at 64. The cylinder is pivoted to the frame as at 70. Vertical movement of the forward end of the scraper is provided by a hydraulic cylinder and piston 72, the piston being pivoted to a bracket 74 on the frame as at 76 and the cylinder being pivoted to a bracket 78 on arm 38 as at 80. Although not shown in the drawings, a source of hydraulic pressure, suitable hydraulic lines and controls are provided for cylinder and pistons 66 and 72 so that the dump flaps and the vertical position of the scraper blade 44 may be controlled from the operator's seat in the tractor.

Figure 2:
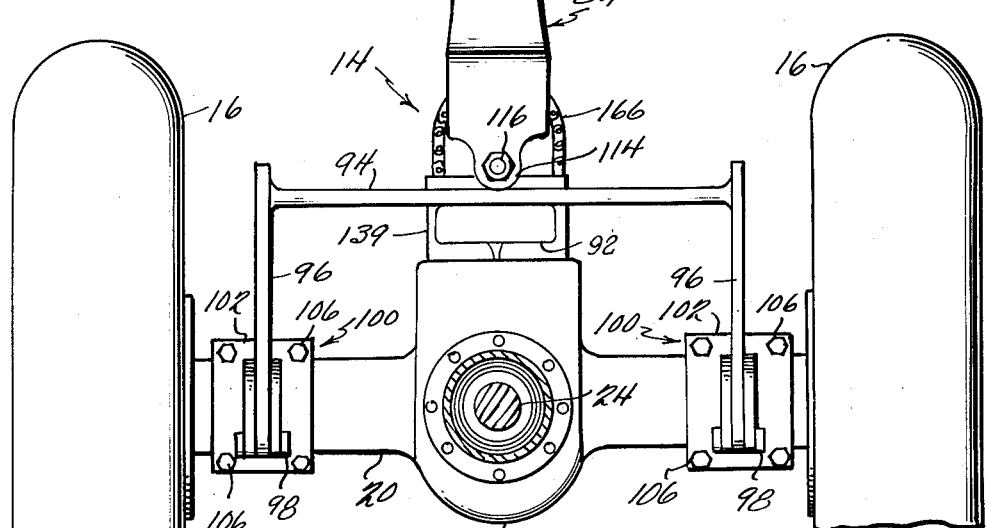
FIGURE 2 is an elevational view of the rear axle of the tractor of FIGURE 1 looking toward the rear and showing the coupling mounted thereon.
Figure 3:
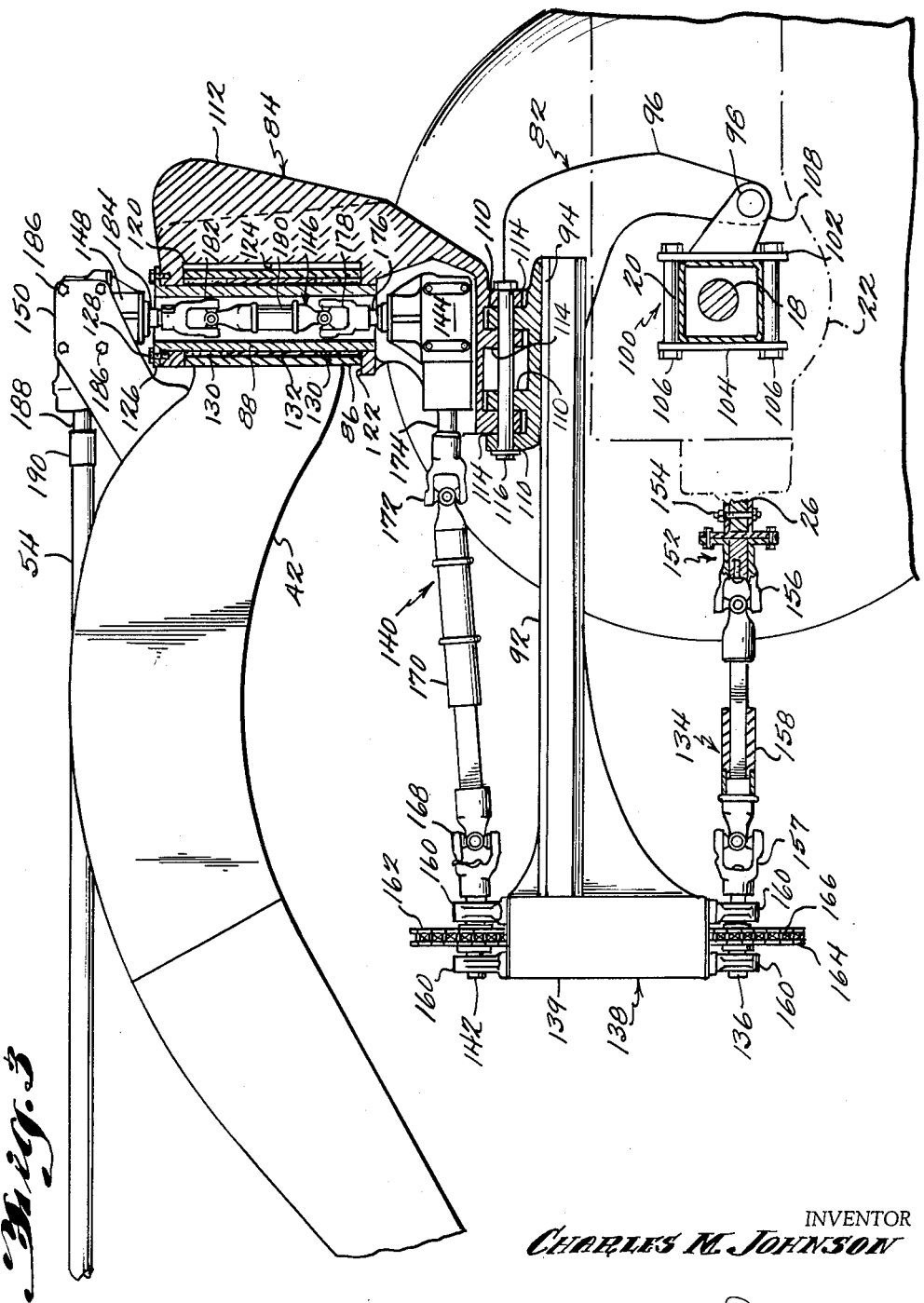
FIGURE 3 is a fragmentary side elevational view, partly in section, of the coupling and power transmitting drive of FIGURE 1.

As seen in FIGURES 2 and 3, the coupling of the present invention provides for relative pivoting about three mutually perpendicular axes by means of a yoke member 82 pivoted for rotation about an axis parallel to the axle 18 of the tractor 10, a clevis member 84 pivoted to the upper part of the yoke member 82 for rotation about a longitudinal axis, and a vertical outer sleeve member 86 integral with the gooseneck 42 and rotatable about an inner sleeve member 88 fixed to the upper part of the clevis member 84.

The yoke member 82 includes a body portion 94 parallel to the tractor rear axle housing 20 and a pair of depending spaced leg portions 96 each pivoted by a suitable removable pin 98 for rotation forward and backward about an axis parallel to the axle housing 20. A support bar 92 is secured to the body portion 94 in any convenient manner as by welding and extends rearwardly therefrom for rigidly supporting part 138 of the power transmitting drive which will be described hereinafter. The pins 98 are mounted by means of a pair of bracket assemblies 100 which are attached to the axle housing 20 on opposite sides of the differential housing 22. Each bracket assembly 100 includes front and rear plates 102 and 104, respectively, clamped to the front and rear of the axle housing 20 by means of four bolts 106 located at the corners of the plates. Extending forwardly from each front plate 102 and attached thereto as by welding is a lug 108 having a horizontal hole therein for receiving one of the pivot pins 98. The upper portion of the yoke member 82 terminates in three spaced perforated ears 110.

The clevis member 84 is a vertical, generally C-shaped member having a vertical forwardly extending boss 112 and three spaced perforated ears 114 depending therefrom into engagement with the ears 110 on the yoke member 82. A pin 116 fits horizontally through the perforation in the ears 110 and 114 and thereby provides for lateral rotation of the clevis 84 about an axis which is longitudinal of the tractor. The upper rear edge of the clevis is provided with a generally horizontally extending socket defined by an upper horizontal surface 120, a lower horizontal surface 122 and a connecting vertical surface 124. The socket is adapted to receive the vertical outer gooseneck sleeve 86 which is held therein by the hollow inner coaxial sleeve 88 extending through a vertical hole provided through the upper and lower surfaces 120 and 122. The top of the inner sleeve 88 is provided with an outwardly extending radial flange 126 which rests on the top of the clevis member 84 and is fastened thereto by cap screws 128. A pair of bushings 130, vertically spaced by a spacer 132, is retained in the annulus between the sleeves 88 and 86 and provided for rotation of the outer sleeve about the inner sleeve.

The power transmitting drive for transmitting rotary motion from the conventional power take-off shaft 26 on the tractor to the drive shaft 54 of the conveyor 28 is arranged to be supported by the coupling described above. As seen in FIGURE 3, the drive includes a first generally horizontal flexible and telescopic section 134 between the power take-off 26 on the tractor and the input shaft 136 of a vertical chain drive unit 138, a second generally horizontal flexible and telescopic section 140 between the output shaft 142 of the chain drive unit 138 and a lower gear box 144 mounted on the lower part of the clevis member 84, and a generally vertical flexible section 146 extending coaxially through the inner sleeve 88 between the lower gear box 144 and an upper gear box 148 mounted on a bracket 150 on the gooseneck 42.

The first, or lower, drive section 134 includes a conventional shear pin plate and hub assembly 152 pinned as by pin 154 to the power-take-off shaft 26 of the tractor which conventionally extends rearwardly from the differential housing 22 of the tractor. The drive section 134 further includes fore and aft universal joints 156 and 157, respectively, each of which is connected to an opposite end of a telescopic drive shaft 158. The aft universal joint 157 connects at its rear end with the input shaft 136 of the chain drive unit 138.

The chain drive unit 138 includes a vertical housing 139 having top and bottom openings (not shown) therein and rigidly secured to the rear end of the mounting bar 92 of the yoke member 82. A pair of longitudinally spaced bearings 160 are mounted on the upper and lower surfaces of the housing 139 and provide for the journalling of output and input shafts, 142 and 136 respectively. On the output and input shafts between the spaced bearings 160 are mounted upper and lower sprocket wheels 162 and 164 respectively. An endless chain 166 extends through the housing 139 and through the upper and lower openings therein and is trained over the sprocket wheels 162 and 164. The housing 139 is preferably arranged so that the input shaft 136 is substantially aligned with the power-take-off shaft 26 when the tractor 10 and scraper 12 are both on level ground.

The second, or upper, flexible and telescopic section 140 of the drive includes an aft universal joint 168 connected to the output shaft 142 of the chain drive unit and to one element of a telescopic drive shaft 170 and a forward universal joint 172 connected to the other element of the telescopic drive shaft 170 and to the generally horizontal input shaft 174 of the first gear box 144 which is rigidly mounted in any suitable manner on the lower part of the clevis member 84. The output shaft 176 of the gear box 144 extends upwardly at a right angle to the input shaft 174.

The generally vertical section 146 of the drive includes a lower universal joint 178 splined to the output shaft 176 of the lower gear box 144. The remainder of the vertical section includes a short length of rigid drive shaft 180 and an upper universal joint 182 connected to the input shaft 184 of the upper, gear box 148. The upper gear box is mounted on the bracket 150 on the gooseneck as by bolts 186 so as to be positioned directly above the sleeves 86 and 88 of the pivotal connection between gooseneck 42 and clevis 84 and directly above the lower gear box 144. The output shaft 176 of the latter is thereby in substantial alignment with the input shaft 184 of the upper gear box 148 so as to permit the drive between them to pass through the bore of the inner sleeve 88.

The output shaft 188 from the upper, gear box 148 extends rearwardly from the gear box and is connected to the input drive shaft 54 for the conveyor 28 by any suitable connector such as at 190. The conveyor drive shaft 54 will conventionally include a telescopic section 56 to compensate for the relative movement between the conveyor gear box and the upper gear box 148, occasioned by vertical movement of the front of the scraper by means of the cylinder and piston 72.

In operation, the scraper 12 will be propelled along the ground by the tractor 10. As viewed in FIGURE 1, the scraper is in a position for carrying its contents over the ground to a desired location. This position is effected by contraction of cylinder and piston 72 to maintain the front of the machine, and consequently the scraper blade 44, above the ground. Additionally, the dump flaps are maintained closed by contraction of cylinder and piston 66. In order to dump the contents of the scraper, the tractor operator will open the dump flaps by extending cylinder and piston 66 while continuing the movement of the scraper over the ground. In order to scrape dirt into the scraper the tractor operator closes the dump flaps and lowers the scraper blade 44 into engagement with the ground by extending cylinder and piston 72. Loosened dirt that passes over the scraper blade is scraped rearwardly into the machine by the flights 60 of the conveyor 28 which move clockwise as viewed in FIGURE 1. During adjustments of the vertical position of the front of the scraper, the telescopic section 56 in the conveyor drive shaft 54 will compensate for relative longitudinal movement between the conveyor gear box (not shown) and the upper gear box 148 on the gooseneck 42.

The operation of the coupling during relative movement of the scraper and the tractor is readily apparent from the above description. When either the tractor 10 or the scraper 12 move onto or off of a slope, the resulting relative movement in a vertical plane takes place between the yoke 82 and the lugs 108 about an axis through the pins 98. When either the tractor or the scraper tilts laterally when moving over uneven ground, the resulting relative movement in a vertical plane takes place between the yoke 82 and the clevis 84 about an axis through the pin 116. When the tractor changes direction as in making a turn, the resulting relative movement in a horizontal plane takes place between the sleeves 86 and 88 about the axis of the sleeves.

The operation of the drive between the power-take-off shaft 26 and the upper gear box 148 is maintained during relative movement of the yoke, clevis and sleeves by the drive arrangement described above. During turning of the tractor, the drive is unaffected by rotation between the sleeves 86 and 88. However, during lateral tilting of the tractor or scraper and particularly when either machine moves onto or off of a slope, movement between yoke 82 and clevis 84 and between yoke 82 and tractor axle housing 20 will result, respectively in changes in the distance between the chain drive unit 138 and the power-take-off shaft 26 and in changes between the chain drive unit 138 and the lower gear box 144. Lateral pivoting of the clevis 84 on the yoke 82 alters the distance between the output shaft 142 of the chain drive unit 138 and the input shaft 174 of the lower gear box 144. The transverse and vertical components of these changes are compensated for by the universal joints 156, 157, 168 and 172 and the longitudinal component, which is quite small, is compensated for by the telescopic shaft 158.

One of the important features of the novel drive of the present invention is the minimizing of the longitudinal component of the changes which occur in the drive during movement between the yoke 82 and the axle housing 20. In known prior arrangements the chain drive unit 138, or its equivalent, is fixed with respect to the tractor frame and thus begins to pivot about the tractor axle when, for example, the front wheels of the tractor begin to negotiate a slope. Further pivoting occurs when the axle begins to rise as the rear wheels pass onto the slope. In the prior arrangements the longitudinal component of these two changes in distance is compensated for solely by a single telescopic drive shaft section which is located between the chain drive output and the clevis member or its equivalent. In the present arrangement, however, the total longitudinal component is considerably less than in the prior arrangement because of the pivoting of the yoke member 82 at 98. Thus, in the present arrangement, vertical movement of the front wheels, as the tractor begins to negotiate a slope, results in some operation of the lower telescopic shaft 158 as a result of the pivotal movement of the yoke and attached chain drive unit about the axis of pins 98. As the rear wheels pass onto the slope, the lower telescopic shaft 158 will again operate as a result of further pivotal movement about the pins 98. However, the yoke 82 will pivot about the pins 98 during these movements of the shaft 158 and will thereby reduce the large telescoping action which would be required if the yoke were not pivoted.

In order to remove the drive and coupling from the tractor it is necessary only to uncouple the power-take-off shaft 26 from the lower drive section 134 and to remove the pins 98 from the bracket assemblies 100 and the legs 96 of the yoke 82. The bracket assemblies 100 may be left on the axle housing 20 so as to be available when the tractor is again to be used for towing the scraper or they may be removed after removing the bolts 106 and installed on another tractor. Thus, the unitary drive and coupling is easily and rapidly attached to different tractors without requiring any modifications to the tractors, other than the simple bolting on of the bracket assemblies.

The drive may be detached from the gooseneck 42 of the scraper by breaking the connection 190 between the conveyor drive shaft 54 and the upper gear box output shaft 188, removing the bolts 186 which attach the gear box to its bracket 150 and by then pulling the gear box upwardly to disconnect the spline connection between the output shaft 176 of the lower gear box 144 and the lower universal joint 178 in the vertical section 146 of the drive.

The coupling may then be freed from the gooseneck 42 by removing the cap screws 128 which hold the inner sleeve 88 to the clevis 84 and withdrawing the inner sleeve. The outer sleeve 86 on the end of the gooseneck may then be withdrawn from the socket in the clevis 84.

While the coupling and drive arrangement has been illustrated and described in the preferred combination with a semi-trailer type of earth-scraper having a power driven conveyor thereon, the invention is not limited to this particular combination. Obviously, the drive and coupling may be employed in combination with any trailer or semi-trailer type of vehicle which carries power-driven elements thereon.

What is claimed is:

1. In a power transmitting drive and coupling device for coupling a vehicle to a prime mover having a transverse rear axle and housing therefor and a rearwardly extending auxiliary power driven drive shaft, said devise including means for transmitting rotary motion from the auxiliary drive shaft while compensating for relative movement between the vehicle and the prime mover, the improved construction comprising: a yoke member having spaced depending legs adapted near their extremities to be detachably connected to the rear axle housing of the prime mover at transversely spaced locations for rotation about an axis parallel to the housing; power transmission means having an input shaft and an output shaft vertically spaced from and generally parallel to said input shaft; transmission support means rigidly connected to said yoke member and extending rearwardly thereof, said transmission means being rigidly connected to said support means rearwardly of said yoke member with said input shaft in substantial alignment with the auxiliary power drive shaft; means for pivotally coupling the vehicle to the prime mover for rotation about a generally vertical axis; and means mounting said coupling means on top of said yoke member for rotation about an axis longitudinal to said prime mover.

2. A power transmitting drive and coupling device as in claim 1 further comprising: bracket means removably attachable to the rear axle housing of the prime mover; and removable pin means for pivoting said legs of said yoke member to said bracket means.

3. A power transmitting drive and coupling device for coupling a vehicle to a prime mover having a transverse rear axle housing and a rearwardly extending auxiliary power driven drive shaft comprising: a first coupling member adapted to be pivotally attached to the rear of the prime mover for rotation about an axis transverse to the prime mover; a second coupling member pivoted on said first coupling member about an axis longitudinal to said prime mover, said second coupling member including an upwardly projecting portion having a substantially vertical bore therein; means associated with said upwardly projecting portion for pivotally coupling the vehicle to said upwardly projecting portion for rotation about the axis of said bore; a gear box mounted on said second coupling member and having an output shaft in alignment with said bore and an input shaft at substantially a right angle to the output shaft; power transmission means having an input shaft and an output shaft vertically spaced from and generally parallel to said transmission means input shaft; means rigidly mounting said power transmission means on said first coupling member in spaced horizontal relationship thereto with said transmission input shaft in substantial alignment with the auxiliary drive shaft on the prime mover; a first telescopic drive shaft connecting with said transmission means input shaft and connectable with the auxiliary drive shaft; and a second telescopic drive shaft connecting with said transmission means output shaft and with said input shaft of said gear box.

4. A power transmitting drive and coupling as in claim 3 in which said upwardly projecting portion of said second coupling member defines a generally horizontally extending socket which communicates with the bore in said portion and further comprising: a hollow sleeve member slidable in said bore and passing through said socket; and means for securing said sleeve member to said second coupling member.

5. A power transmitting drive and coupling as in claim 3 further comprising bracket means removably attachable to the rear of the prime mover; and removable pin means for pivoting said first coupling member to said bracket means on an axis transverse to the prime mover.

6. Apparatus as in claim 5 in which said bracket means comprise spaced clamping members movable relative to each other.

7. In combination: a prime mover having a rearwardly extending auxiliary power driven drive shaft thereon; a first coupling member having spaced depending legs pivoted on said prime mover near the rear end thereof for rotation about an axis transverse to said prime mover; a second coupling member pivoted on said first coupling member for rotation about an axis longitudinal to said prime mover, said second coupling member including an upwardly projecting portion having a substantially vertical bore therein; a vehicle in trailing relationship with said prime mover and having power driven elements thereon; a forward extension on said vehicle; means for rotatably mounting said extension on said upwardly projecting portion for rotation about the axis of said bore; rotatable shaft means substantially coaxial in said bore and connected at its lower end with first gear means fixed relative to said second coupling member and connected at its upper end with second gear means fixed relative to said extension for operating said power driven elements; power transmission means having an input shaft and an output shaft vertically spaced from and generally parallel to said input shaft; means rigidly mounting said power transmission means on said first coupling member in spaced horizontal relationship thereto with said transmission means input shaft in subtantial alignment with said auxiliary drive shaft on said prime mover; rotatable shaft means connecting said auxiliary drive shaft with said transmission means; and rotatable shaft means connecting said transmission output shaft with said first gear means.

8. Apparatus as in claim 7 in which said upwardly projecting portion of said second coupling member defines a generally horizontal socket which communicates with said bore in said portion and further comprising: a generally vertical sleeve fixed relative to said extension on said vehicle and adapted to be inserted into said socket; a hollow sleeve member slidable in said bore and through said first-mentioned sleeve whereby said extension is rotatable about said hollow sleeve member; and means for securing said hollow sleeve member to said second coupling member.

9. Apparatus as in claim 7 further comprising: bracket means removably attachable to said prime mover; and removable pin means for pivoting said legs of said first coupling member to said bracket means on an axis transverse to said prime mover whereby said first coupling member is readily detached from said prime mover.

10. Apparatus as in claim 9 in which said bracket means comprise spaced clamping members movable relative to each other.

References Cited in the file of this patent

UNITED STATES PATENTS

| | | |
|---|---|---|
| 2,276,573 | Gustafson | Mar. 17, 1942 |
| 2,931,451 | Hancock | Apr. 5, 1960 |